Patented Nov. 21, 1939

2,180,730

UNITED STATES PATENT OFFICE 2,180,730

ALKYL 12-KETOSTEARATE

Henry L. Cox, South Charleston, W. Va., assignor, by mesne assignments, to Union Carbide and Carbon Corporation, a corporation of New York No Drawing. Application June 7, 1934, Serial No. 729,442

3 Claims. (Cl. 260—410)

The invention relates to new chemical compounds, in particular ester derivatives of 12-ketostearic acid.

The scope of the invention, and the new chemical compounds included therein, may be represented by the following structural formula:

$$[CH_3-(CH_2)_5-CO-(CH_2)_{10}-COO]_nR$$

in which R is an aliphatic or aromatic radical indicative of an ester compound, and $n$ will be one or more depending upon the valency of R. These compounds are solid waxy materials at atmospheric temperatures, and the esters exhibit properties especially desirable as stabilizers and plasticizers in lacquer and plastic compositions formulated from natural and synthetic gums and resins.

The 12-ketostearic acid may be prepared by oxidizing 12-hydroxy-stearic acid, $$CH_3(CH_2)_5CH(OH)(CH_2)_{10}COOH$$

which in turn can be synthesized from castor oil. Castor oil consists chiefly of the glyceride of ricinoleic acid, or triricinolein, which when hydrogenated, saponified with sodium hydroxide, and then hydrolyzed with acid, will yield the above hydroxystearic acid. By further treatment of this acid with chromic acid, or other oxidizing agent, a carbonyl group is formed at the 12 position of the molecule, and the resulting product is 12-ketostearic acid. By reaction with an alcohol, esters of this ketostearic acid may be formed.

As illustrative of the manner of preparing the 12-ketostearic acid, and certain of its derivatives, the following examples are given:

Example 1

Castor oil was treated in the manner previously indicated, and a quantity of 12-hydroxystearic acid was obtained and identified by its known properties. 150 grams of this hydroxystearic acid was dissolved in 250 grams of acetic acid. With constant stirring a mixture of 30 grams of chromic acid ($CrO_3$) in 500 grams of acetic acid was gradually added at a temperature of 30° to 35° C. After the reaction was complete, the whole was poured into several volumes of water, and a crude product crystallized out. This was dissolved in methanol, again precipitated with water, and then dried. A final yield of 120 grams was obtained, which had an acetyl number of substantially zero, and an equivalent weight and other properties indicating the product 12-ketostearic acid, which may be represented by the structural formula $$CH_3-(CH_2)_5-CO-(CH_2)_{10}-COOH$$

Example 2

100 grams of 12-ketostearic acid was heated with 500 grams of methanol in the presence of two grams of sulfuric acid as a catalyst. As methanol distilled off more was added to maintain a constant level of the reaction mixture. At completion of the reaction, the mixture was poured into several volumes of water and the ester precipitated. It was then separated out and distilled under reduced pressure. The cut obtained at 178° to 185° C. (mostly at 180° C.) at 1 mm. pressure was identified from its equivalent weight, as determined by saponification and the hydroxylamine method, as methyl 12-ketostearate. This product was a wax-like solid having a melting point of 42.5° C., and the probable structural formula $$CH_3-(CH_2)_5-CO-(CH_2)_{10}-COOCH_3$$

Example 3

Butanol in an excess of one mol was heated with 12-ketostearic acid in the presence of catalytic proportions of sulfuric acid. After completion of the reaction the mixture was neutralized with a dilute sodium hydroxide solution and distilled. The fraction distilling at 208° to 212° C. at 2 mm. pressure was collected. This product was identified from its equivalent weight and other properties as butyl 12-ketostearate. It was a wax-like solid having a melting point of 56° C., and the probable structural formula $$CH_3-(CH_2)_5-CO-(CH_2)_{10}-COOC_4H_9$$

The above examples are merely illustrative in nature, and are representative of many other esters of 12-ketostearic acid which are included within the scope of this invention. An aromatic as well as other aliphatic alcohols may be used in esterifying the acid.

The invention should not be limited other than as defined in the appended claims.

I claim:

1. An alkyl ester of 12-ketostearic acid.
2. A 12-ketostearic acid ester of an aliphatic alcohol.
3. Methyl 12-ketostearate.

HENRY L. COX.